United States Patent
Haverinen

(10) Patent No.: US 10,121,119 B2
(45) Date of Patent: Nov. 6, 2018

(54) ORDER MANAGEMENT

(71) Applicant: INDOORATLAS OY, Oulu (FI)

(72) Inventor: Janne Haverinen, Oulu (FI)

(73) Assignee: INDOORATLAS OY, Oulu (FI)

( * ) Notice: Subject to any disclaimer, the term of this patent is extended or adjusted under 35 U.S.C. 154(b) by 452 days.

(21) Appl. No.: 14/837,678

(22) Filed: Aug. 27, 2015

(65) Prior Publication Data

US 2017/0061371 A1  Mar. 2, 2017

(51) Int. Cl.
| | | |
|---|---|---|
| G06Q 10/08 | (2012.01) | |
| G06Q 30/06 | (2012.01) | |
| H04W 4/04 | (2009.01) | |
| H04W 4/21 | (2018.01) | |

(52) U.S. Cl.
CPC ..... *G06Q 10/0835* (2013.01); *G06Q 10/0837* (2013.01); *G06Q 30/0603* (2013.01); *G06Q 30/0635* (2013.01); *G06Q 30/0641* (2013.01); *H04W 4/043* (2013.01); *H04W 4/21* (2018.02)

(58) Field of Classification Search
CPC .................................................... G06Q 30/06
USPC ........................................................ 705/26.1
See application file for complete search history.

(56) References Cited

U.S. PATENT DOCUMENTS

| | | |
|---|---|---|
| 724,620 A | 4/1903 | Schmidt |
| 8,798,924 B2 | 8/2014 | Haverinen |
| 2013/0132140 A1 | 5/2013 | Amin et al. |
| 2013/0132246 A1 | 5/2013 | Amin et al. |
| 2013/0132887 A1 | 5/2013 | Amin et al. |
| 2013/0215116 A1* | 8/2013 | Siddique ............ G06Q 30/0643 345/420 |
| 2013/0246301 A1 | 9/2013 | Radhakrishnan et al. |
| 2013/0268406 A1 | 10/2013 | Radhakrishnan et al. |
| 2014/0129302 A1 | 5/2014 | Amin et al. |

(Continued)

FOREIGN PATENT DOCUMENTS

| | | |
|---|---|---|
| CA | 2 878 203 A1 | 1/2014 |
| WO | 2014/074319 A1 | 5/2014 |

(Continued)

OTHER PUBLICATIONS

Oct. 21, 2016 Search Report issued in International Patent Application No. PCT/FI2016/050580.

(Continued)

*Primary Examiner* — Mila Airapetian
(74) *Attorney, Agent, or Firm* — Oliff PLC

(57) ABSTRACT

An initial indoor location inside a building is obtained with indoor positioning for a consumer mobile apparatus. Information relating to a common catalog including products available from a plurality of retail outlets inside the building is transmitted to the consumer mobile apparatus. A purchase order of products selected based on the information relating to the common catalog is received from the consumer mobile apparatus. A subsequent indoor location is obtained with the indoor positioning for the consumer mobile apparatus. If the subsequent indoor location is inside the building, a delivery location of the products inside the building is determined with the consumer mobile apparatus, and a delivery order of the products determining the delivery location and collection instructions for the products from the retail outlets inside the building is transmitted to a courier mobile apparatus.

18 Claims, 6 Drawing Sheets

(56) References Cited

U.S. PATENT DOCUMENTS

| | | | |
|---|---|---|---|
| 2014/0129951 A1 | 5/2014 | Amin et al. | |
| 2014/0279011 A1 | 9/2014 | McMullen et al. | |
| 2014/0297470 A1* | 10/2014 | Ramadge ........... | G06Q 30/0613 705/26.41 |
| 2015/0058129 A1 | 2/2015 | Nevid et al. | |
| 2015/0073980 A1* | 3/2015 | Griffin ................ | H04W 4/008 705/39 |
| 2015/0106403 A1 | 4/2015 | Haverinen et al. | |
| 2015/0178778 A1* | 6/2015 | Lee .................... | G06Q 30/0261 705/14.58 |

FOREIGN PATENT DOCUMENTS

| | | |
|---|---|---|
| WO | 2014/074407 A1 | 5/2014 |
| WO | 2014/159769 A1 | 10/2014 |
| WO | 2015/002765 A1 | 1/2015 |
| WO | 2015/051333 A1 | 4/2015 |

OTHER PUBLICATIONS

U.S. Appl. No. 13/733,439, filed Jan. 3, 2013 in the name of Haverinen.
U.S. Appl. No. 14/299,582, filed Jun. 9, 2014 in the name of Haverinen.
U.S. Appl. No. 13/927,854, filed Jun. 26, 2013 in the name of Haverinen.
U.S. Appl. No. 13/859,944, filed Apr. 10, 2013 in the name of Haverinen.
U.S. Appl. No. 14/606,358, filed Jan. 27, 2015 in the name of Haverinen.
U.S. Appl. No. 13/739,640, filed Jan. 11, 2013 in the name of Haverinen.
U.S. Appl. No. 13/871,612, filed Apr. 26, 2013 in the name of Perttunen et al.
U.S. Appl. No. 13/905,655, filed May 30, 2013 in the name of Haverinen et al.
U.S. Appl. No. 13/915,016, filed Jun. 11, 2013 in the name of Haverinen et al.
U.S. Appl. No. 14/054,264, filed Oct. 15, 2013 in the name of Haverinen et al.
U.S. Appl. No. 14/093,250, filed Nov. 29, 2013 in the name of Haverinen et al.
U.S. Appl. No. 14/207,916, filed Mar. 13, 2014 in the name of Rantalankila et al.
U.S. Appl. No. 14/524,420, filed Oct. 27, 2014 in the name of Haverinen et al.
Wikipedia: The Free Encyclopedia. "Uber (company)." Oct. 4, 2015. <https://en.wikipedia.org/wiki/Uber_(company)>.
Uber News. "Introducing UberRush." Feb. 2, 2015. <http://blog.uber.com/new-jersey-uberrush>.
Uber News. "The Everyday Items You Need in 10 Minutes or Less." Aug. 18, 2014. <http://blog.uber.com/essentials>.
Instacart. <https://www.instacart.com/shoppers>.
Eaze. <http://www.eazeup.com/#/home#how-works>.

* cited by examiner

ORDER MANAGEMENT

FIELD

The invention relates to an order management apparatus, a non-transitory computer-readable storage medium comprising a computer program for an order management apparatus, and a method in an order management apparatus.

BACKGROUND

Traditional retail outlets are facing fierce competition from online shopping, and, consequently, services offered by the retail outlets require further sophistication.

BRIEF DESCRIPTION

The present invention seeks to provide an improved order management apparatus, an improved computer program, and an improved method.

According to an aspect of the present invention, there is provided an order management apparatus comprising: a data communication interface; an indoor positioning interface; one or more processors; and one or more memories including computer program code, the one or more memories and the computer program code configured to, with the one or more processors, cause the order management apparatus at least to: obtain, with the indoor positioning interface, for a consumer mobile apparatus, an initial indoor location inside a building; transmit, with the data communication interface, to the consumer mobile apparatus, information relating to a common catalog including products available from a plurality of retail outlets inside the building; receive, with the data communication interface, from the consumer mobile apparatus, a purchase order of products selected based on the information relating to the common catalog; obtain, with the indoor positioning interface, for the consumer mobile apparatus, a subsequent indoor location; and if the subsequent indoor location is inside the building, determine, with the data communication interface, with the consumer mobile apparatus, a delivery location of the products inside the building, and transmit, with the data communication interface, to a courier mobile apparatus, a delivery order of the products determining the delivery location and collection instructions for the products from the retail outlets inside the building.

According to another aspect of the present invention, there is provided a non-transitory computer-readable storage medium comprising a computer program comprising computer program code which, when loaded into an order management apparatus causes the order management apparatus at least to: obtain, with indoor positioning, for a consumer mobile apparatus, an initial indoor location inside a building; transmit, to the consumer mobile apparatus, information relating to a common catalog including products available from a plurality of retail outlets inside the building; receive, from the consumer mobile apparatus, a purchase order of products selected based on the information relating to the common catalog; obtain, with the indoor positioning, for the consumer mobile apparatus, a subsequent indoor location; and if the subsequent indoor location is inside the building, determine, with the consumer mobile apparatus, a delivery location of the products inside the building, and transmit, to a courier mobile apparatus, a delivery order of the products determining the delivery location and collection instructions for the products from the retail outlets inside the building.

According to another aspect of the present invention, there is provided a method in an order management apparatus comprising: obtaining, with indoor positioning, for a consumer mobile apparatus, an initial indoor location inside a building; transmitting, to the consumer mobile apparatus, information relating to a common catalog including products available from a plurality of retail outlets inside the building; receiving, from the consumer mobile apparatus, a purchase order of products selected based on the information relating to the common catalog; obtaining, with the indoor positioning, for the consumer mobile apparatus, a subsequent indoor location; and if the subsequent indoor location is inside the building, determining, with the consumer mobile apparatus, a delivery location of the products inside the building, and transmitting, to a courier mobile apparatus, a delivery order of the products determining the delivery location and collection instructions for the products from the retail outlets inside the building.

LIST OF DRAWINGS

Example embodiments of the present invention are described below, by way of example only, with reference to the accompanying drawings, in which FIG. 1 illustrates example embodiments of an order management apparatus and its general operating environment;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the mobile apparatuses have been depicted as separate single entities, different parts may be implemented in one or more physical or logical entities.

Figure 1:
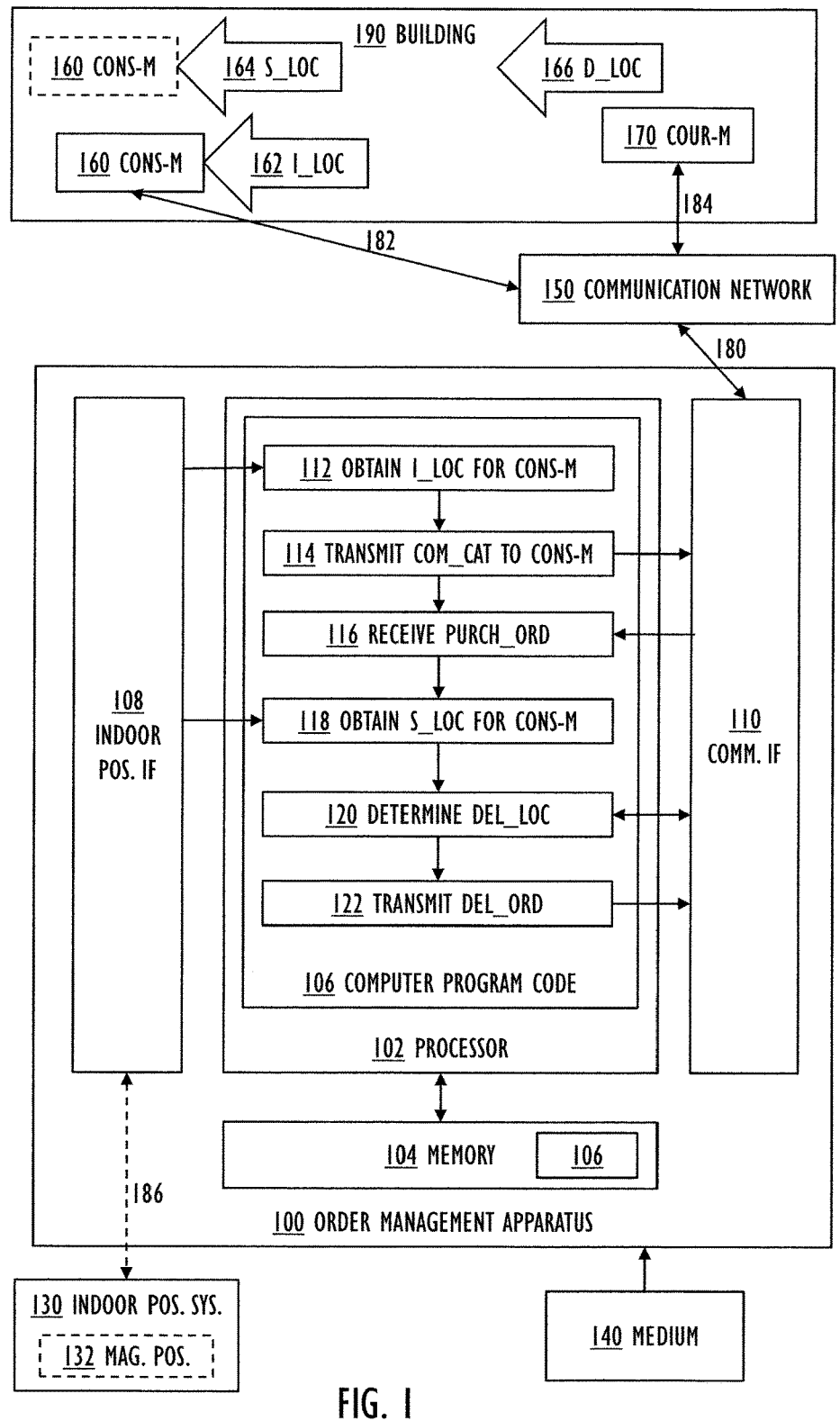

FIG. 1 illustrates example embodiments of an order management apparatus 100 and its general operating environment.

The order management apparatus 100 comprises one or more processors 102 and one or more memories 104 including computer program code 106.

The order management apparatus 100 may communicate 180, 182, 184, with a data communication interface 150, with a consumer mobile apparatus 160 and a courier mobile apparatus 170 through a communication network 150. The order management apparatus 100 may interact 186, with an indoor positioning interface 108, with an indoor positioning system 130.

In an example embodiment, the order management apparatus 100 may be implemented by a suitable computing resource or a combination of various computing resources.

In an example embodiment, the order management apparatus 100 may be implemented as a single server computer or as a cluster of computers. The server is a part of the client-server computing model that acts as distributed application which partitions tasks or workloads between the provider of a resource or service, called server, and the service requester, called client. The server 100 may serve a plurality of mobile apparatuses 160, 170. The server computer 100 may be a host that is running one or more server programs which share their resources with clients 160, 170. The client 160, 170 may request a service function from the server 100. Also, the client 160, 170 may initiate a communication session with the server 100 which awaits incoming requests.

In an example embodiment, the order management apparatus 100 may also operate according to the cloud computing model, at least in part. Naturally, besides these example embodiments of the order management apparatus 100, other feasible computing architectures may be utilized as well to implement the hardware and software of the order management apparatus 100. Consequently, besides operating according to the client/server architecture, push technology may be utilized as well. In push technology, the request for a transaction is initiated by the order management apparatus 100, whereas with the pull technology the request for the information is initiated by the client 160, 170.

Figure 2:
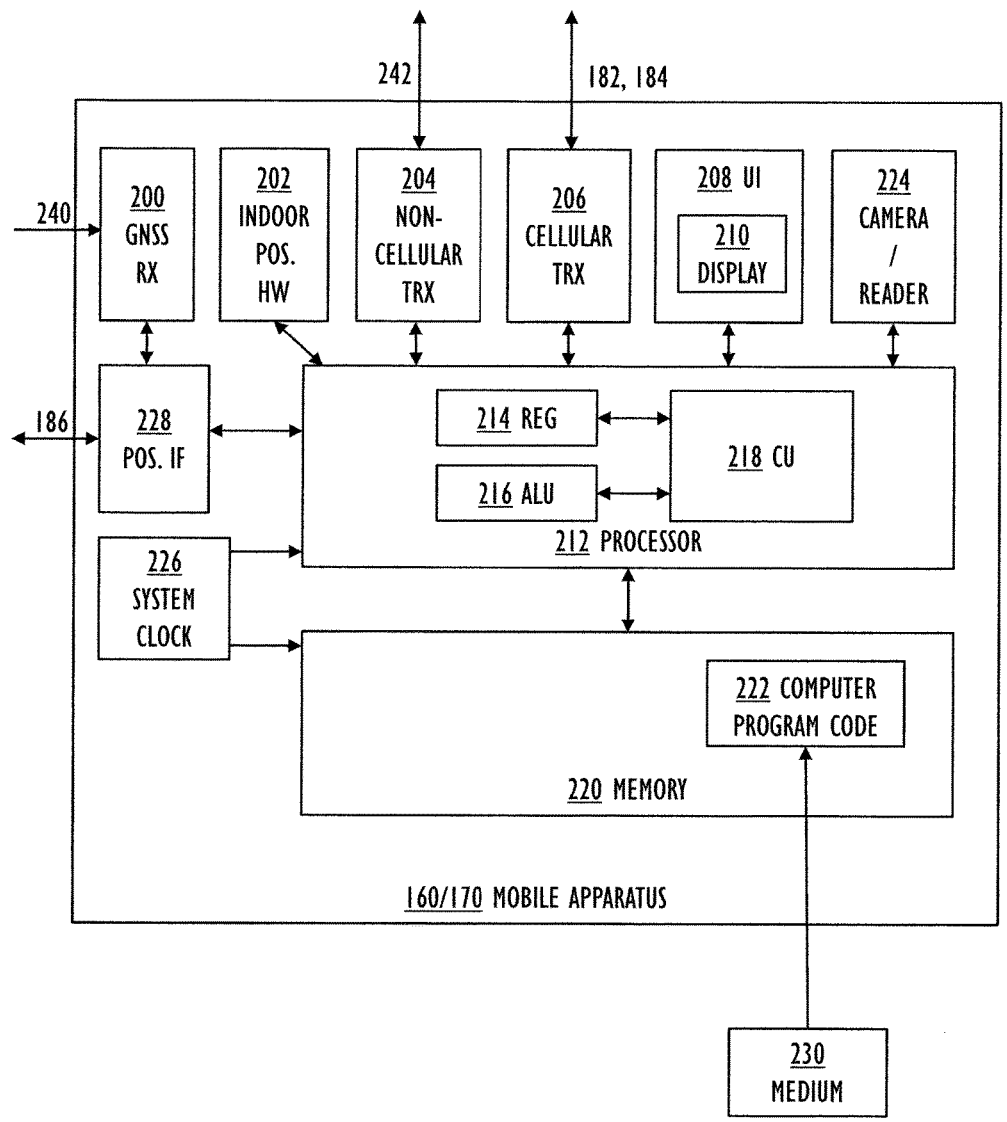
FIG. 2 illustrates example embodiments of a mobile apparatus.

In an example embodiment, the mobile apparatus 160, 170 is a portable electronic communication apparatus. A non-exhaustive list of the types of the mobile apparatus 160, 170 includes: a mobile phone, a smartphone, a tablet computer, a phablet, a smartwatch, a general-purpose mobile computing device. In an example embodiment, the mobile apparatus 160, 170 is a general-purpose off-the-shelf computing device, as opposed to a purpose-build proprietary equipment, whereby research & development costs will be lower as only the special-purpose software (and not the hardware) needs to be designed, implemented and tested. In FIG. 2, an example embodiment of the mobile apparatus 160, 170 is illustrated: the mobile apparatus 160, 170 is a smartphone or a tablet employing a multi-touch display 210. Such devices may employ a suitable operating system such as iOS, Android, or Windows Phone, for example.

In an example embodiment, the communication network 150 comprises at least one wireless standard/non-standard/proprietary communication network, which is coupled with a wired network such as the Internet.

In an example embodiment, the wireless communication network 150 comprises any mobile phone network, regardless of the generation (such as 2G, 3G, 4G, beyond 4G, 5G etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), Mobile WiMAX, and other radio systems (in their present forms and/or in their evolution forms).

In an example embodiment, the communication network supports the use of subscriber identity module (SIM), which may be an integrated circuit storing subscriber data, which is network-specific information used to authenticate and identify the subscriber on the cellular network. The subscriber identity module may be embedded into a removable SIM card. Consequently, the mobile apparatus 160, 170 may include the SIM card (and a SIM card reader). Alternatively, the mobile apparatus 160, 170 may include a virtual or software SIM card.

In an example embodiment, the wireless communication network 150 comprises a wireless local area network (WLAN), a hotspot, or an access point, all of which may provide Internet access through the use of a router connected to a link to an Internet service provider.

In an example embodiment, the indoor positioning interface 108 is configured to obtain indoor locations from an indoor magnetic positioning system 132.

In an example embodiment, the indoor magnetic positioning system 132 is as developed by the Applicant, IndoorAtlas, and disclosed in its various patents/applications, incorporated herein by reference: U.S. Pat. No. 8,798,924, Ser. Nos. 13/733,439, 14/299,582, 13/927,854, 13/859,944, 14/606,358, 13/739,640, 13/871,612, 13/905,655, 13/915,016, 14/054,264, 14/093,250, 14/207,916, and 14/524,420.

In an example embodiment, the indoor positioning system 130 may comprise, instead of or in addition to the indoor magnetic positioning system 132, other applicable techniques such as at least one of a hybrid positioning technology, Wi-Fi-based positioning, WLAN-based positioning, indoor base station-based positioning, IP address-based positioning, and mobile apparatus sensor fusion-based positioning. The indoor positioning interface 108 may apply also a mix of these (and other) indoor positioning techniques in order to obtain the indoor locations.

The indoor positioning system 130, 132 may actually be executed either in the mobile apparatus 160/170 or in an electronic service (similarly implemented as the order management apparatus 100). The actual execution of the indoor positioning may also be divided between the mobile apparatus 160/170 and the electronic service. The indoor locations may be expressed as locations on an indoor map of a building (or even with an indoor coordinate system).

The one or more memories 104 and the computer program code 106 are configured to, with the one or more processors 102, cause the order management apparatus 100 at least to perform the following sequence of six operations:

112) Obtain, with the indoor positioning interface 108, for the consumer mobile apparatus 160, an initial indoor location 162 inside a building 190.

114) Transmit, with the data communication interface 110, to the consumer mobile apparatus 160, information relating to a common catalog including products available from a plurality of retail outlets inside the building 190.

116) Receive, with the data communication interface 110, from the consumer mobile apparatus 160, a purchase order of products selected based on the information relating to the common catalog.

118) Obtain, with the indoor positioning interface 108, for the consumer mobile apparatus 160, a subsequent indoor location 164.

120 & 122) If the subsequent indoor location 164 is inside the building 190, determine, with the data communication interface 110, with the consumer mobile apparatus 160, a delivery location 166 of the products inside the building 190, and transmit, with the data communication interface 110, to the courier mobile apparatus 170, a delivery order of the products determining the delivery location 166 and collection instructions for the products from the retail outlets inside the building 190. The delivery location may be shown on a map on a display of both the consumer mobile apparatus 160 and the courier mobile apparatus 170. The determination of the delivery location 166 may be a negotiation type of process, wherein either party suggests a suitable location, and the other party accepts or rejects it, or may even suggest another location. The building 190 may comprise one or more predetermined delivery locations 166 and these may be clearly marked (with signs or the like).

The described sequence implements a novel and effective way of providing an online shopping facility for a normal offline "bricks-and-mortar" retail outlet. The online shopping and the generation of the purchase order may be implemented with the well-known digital shopping cart model, for example, but with the addition of the indoor positioning and its use for validating that the consumer is in the building 190.

FIG. 2 illustrates example embodiments of the mobile apparatus 160/170. The mobile apparatus 160/170 comprises the display 210, one or more processors 212, and one or more memories 220 including computer program code 222.

In an example embodiment, the display 210 is implemented by an appropriate technology, such as a liquid crystal display (LCD), a thin-film transistor (TFT) display, a light-emitting diode (LED) display, an organic LED (OLED) display, an electroluminescent display (ELD), or an electronic paper (or e-paper or electronic ink) display, for example. The display may also incorporate other user interaction means, such as touch input, or haptic feedback, i.e. the display may be a multi-touch display 210.

In an example embodiment, the display 210 is a part of the user interface 208 implementing the exchange of graphical, textual and auditory information with a user. The user interface 208 may be realized with various techniques, such as the display 210, means for producing sound, a keyboard, and/or a keypad, for example. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 208 may comprise other user interface components, for example various means for focusing a cursor (mouse, track ball, arrow keys, touch sensitive area etc.) or elements enabling audio control.

In an example embodiment, the mobile apparatus 160/170 further comprises a positioning interface 228 configured to obtain an own location of the mobile apparatus 160/170 from a positioning system In an example embodiment, the mobile apparatus 160/170 comprises a GNSS (Global Navigation Satellite System) receiver 200, which generates the location data on the basis of signals received from Earth-orbiting satellites.

In an example embodiment, the mobile apparatus 160/170 comprises indoor magnetic positioning hardware (and software) 202, which generates the location data. The indoor magnetic positioning hardware 202 may comprise a magnetometer to measure variations in the magnetic field of the Earth caused by building structures (especially by steel-reinforced concrete). Furthermore, in some cases, the indoor magnetic positioning hardware 202 may comprise an acceleration sensor (measuring in one, two or three dimensions) and/or a gyroscope, for example.

In an example embodiment, the mobile apparatus 160/170 comprises a cellular radio transceiver 206 and/or a non-cellular radio transceiver 204. The positioning interface 228 may obtain the location data as obtained/generated on the basis of the wireless communication utilizing the transceivers 204 and/or 206.

In an example embodiment, the cellular radio transceiver 206 may be interoperable with the already-mentioned various wireless standard/non-standard/proprietary cellular communication networks 150 such as any mobile phone network.

In an example embodiment, the non-cellular radio transceiver 204 may utilize a short-range radio transceiver such as a Bluetooth, Bluetooth low energy (BLE), Wi-Fi (or WiFi) or other WLAN transceiver (based on IEEE (Institute of Electrical and Electronics Engineers) 802.11 standard or its evolution versions (IEEE 802.11ac etc.), for example).

The positioning interface 228 may also obtain the location data with some other means. In an example embodiment, the mobile apparatus 160/170 may comprise a radio frequency identification (RFID) reader 224 configured to read the location data from an RFID tag attached fixedly to a known location. In an example embodiment, the mobile apparatus 160/170 comprises a camera 224, and the location data may be obtained by photographing a machine readable code (such as a barcode or a QR code) attached fixedly to a known location or by photographing or recording video (from a floor, walls and/or ceiling) and identifying the location from identified unique features.

The term 'processor' 212 refers to a device that is capable of processing data. Depending on the processing power needed, the mobile apparatus 160/170 may comprise several processors 212 such as parallel processors or a multicore processor. When designing the implementation of the processor 212, a person skilled in the art will consider the requirements set for the size and power consumption of the mobile apparatus 160/170, the necessary processing capacity, production costs, and production volumes, for example. The processor 212 and the memory 220 may be implemented by an electronic circuitry.

The term 'memory' 220 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

In an example embodiment, a system clock 226 constantly generates a stream of electrical pulses, which cause the various transferring operations within the mobile apparatus 160/170 to take place in an orderly manner and with specific timing.

In an example embodiment, the processor 212 may be implemented as a microprocessor implementing functions of a central processing unit (CPU) on an integrated circuit. The CPU is a logic machine executing a computer program code 222. The computer program code 222 may be coded as a computer program using a programming language, which may be a high-level programming language, such as C, C++, or Java, or a low-level programming language, such as a machine language, or an assembler, for example. The CPU may comprise a set of registers 214, an arithmetic logic unit (ALU) 216, and a control unit (CU) 218. The control unit 218 is controlled by a sequence of the computer program code 222 transferred to the CPU from the (working) memory 220. The control unit 218 may contain a number of microinstructions for basic operations. The implementation of the microinstructions may vary, depending on the CPU design. The microprocessor 212 may also have an operating system (a dedicated operating system of an embedded system, a real-time operating system, or even a general-purpose operating system), which may provide the computer program code 222 with system services.

A non-exhaustive list of implementation techniques for the processor 212 and the memory 220 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 222 may be implemented by software and/or hardware. In an example embodiment, the software may be written by a suitable programming language, and the resulting executable code 222 may be stored on the memory 220 and run by the processor 212.

In an example embodiment, the functionality of the hardware may be designed by a suitable hardware description language (such as Verilog or VHDL), and transformed into a gate-level netlist (describing standard cells and the electrical connections between them), and after further phases the chip implementing the processor 212, memory 220 and the code 222 of the mobile apparatus 160/170 may be fabricated with photo masks describing the circuitry.

In an example embodiment, the processor 212 and the memory 220 are separate entities, communicatively coupled together by an appropriate serial bus, for example. In general interfaces between the various elements may be implemented with suitable interface technologies, such as a message interface, a method interface, a sub-routine call interface, a block interface, an appropriate serial/parallel bus, or any hardware/software means enabling communication between various sub-units of the mobile apparatus 160/170.

An example embodiment provides a computer-readable medium 230 comprising a computer program comprising the computer program code 222 which, when loaded into the mobile apparatus 160/170 causes the mobile apparatus 160/170 to perform operations relating to the order management in co-operation with the order management apparatus 100. Similarly, an example embodiment provides a computer-readable medium 140 comprising a computer program comprising the computer program code 106 which, when loaded into the order management apparatus 100 causes the order management apparatus 100 to perform operations relating to the order management in co-operation with the mobile apparatus 160/170. There are many ways to structure the computer program code 106, 222. In an example embodiment, the operations of the computer program code 106, 222 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 106, 222 for performing a wide variety of standard operations. In an example embodiment, the computer program code 106, 222 may be in source code form, object code form, executable file, or in some intermediate form. The computer-readable medium 140, 230 may comprise at least the following: any entity or device capable of carrying computer program code 106, 222 to the apparatus 100/160/170, a record medium, a computer memory, a read-only memory, an electrical carrier signal, a telecommunications signal, and a software distribution medium. In some jurisdictions, depending on the legislation and the patent practice, the computer-readable medium 140, 230 may not be the telecommunications signal. In an example embodiment, the computer-readable medium 140, 230 may be a non-transitory computer-readable storage medium.

Note that the example embodiments of the mobile apparatus 160/170, as described with reference to FIG. 2, changing such things that need to be changed, also explain the operation of the order management apparatus 100 as a computing resource.

Naturally, the mobile apparatus 160/170 and the order management apparatus may include various other parts, such as a battery or a database engine, but as they are not needed to further illustrate the example embodiments, they will not be further described.

Now that the basic structures and operation of the order management apparatus 100 have been described, we may proceed in describing the operation of the order management apparatus 100 in more detail with reference to FIG. 3, and FIGS. 4, 5 and 6 illustrating example embodiments of the order management inside the building 190.

Figure 3:
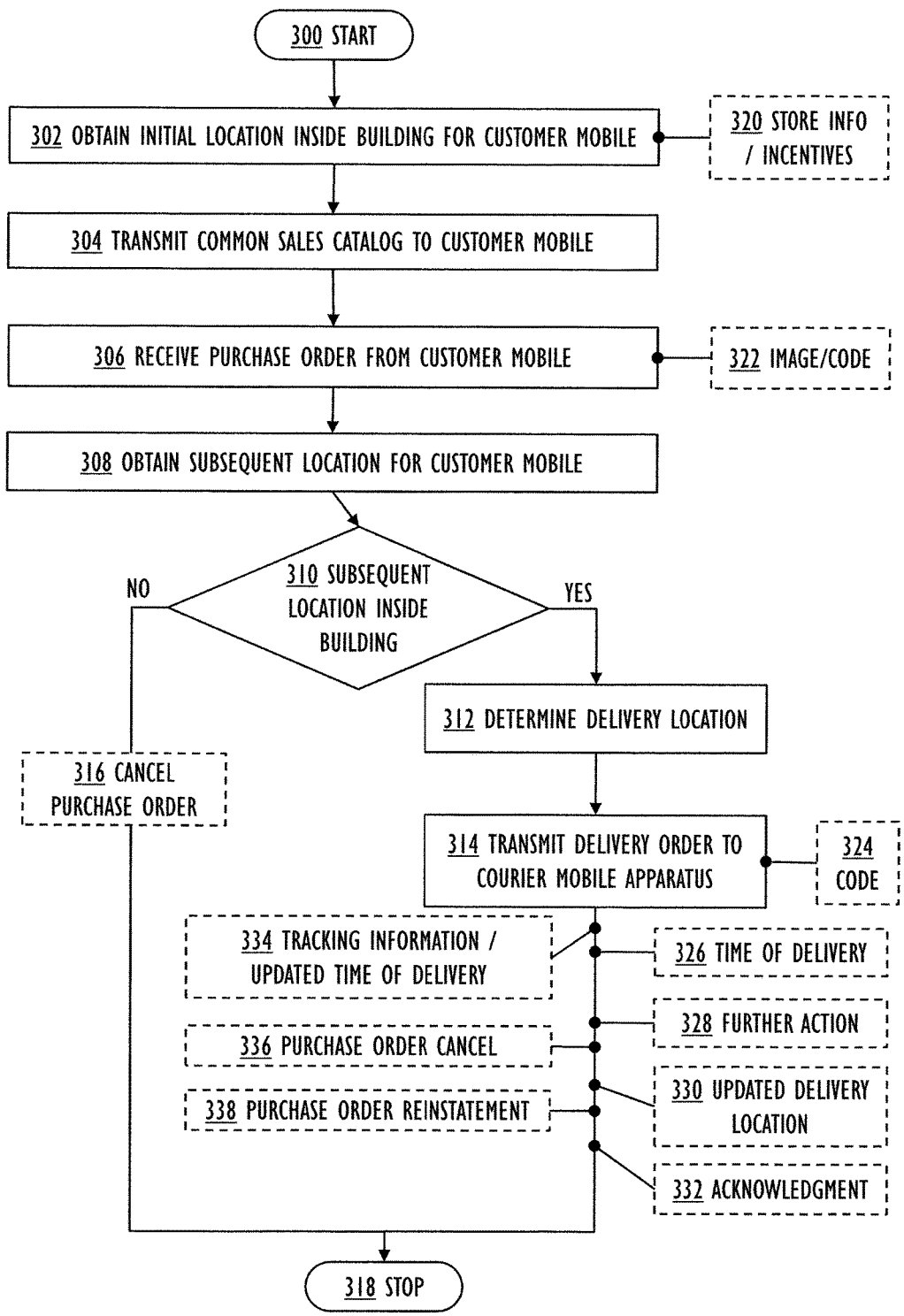
FIG. 3 is a flow chart illustrating example embodiments of a method performed in the order management apparatus.

FIG. 3 illustrates a method performed in the order management apparatus 100. The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

Figure 4:
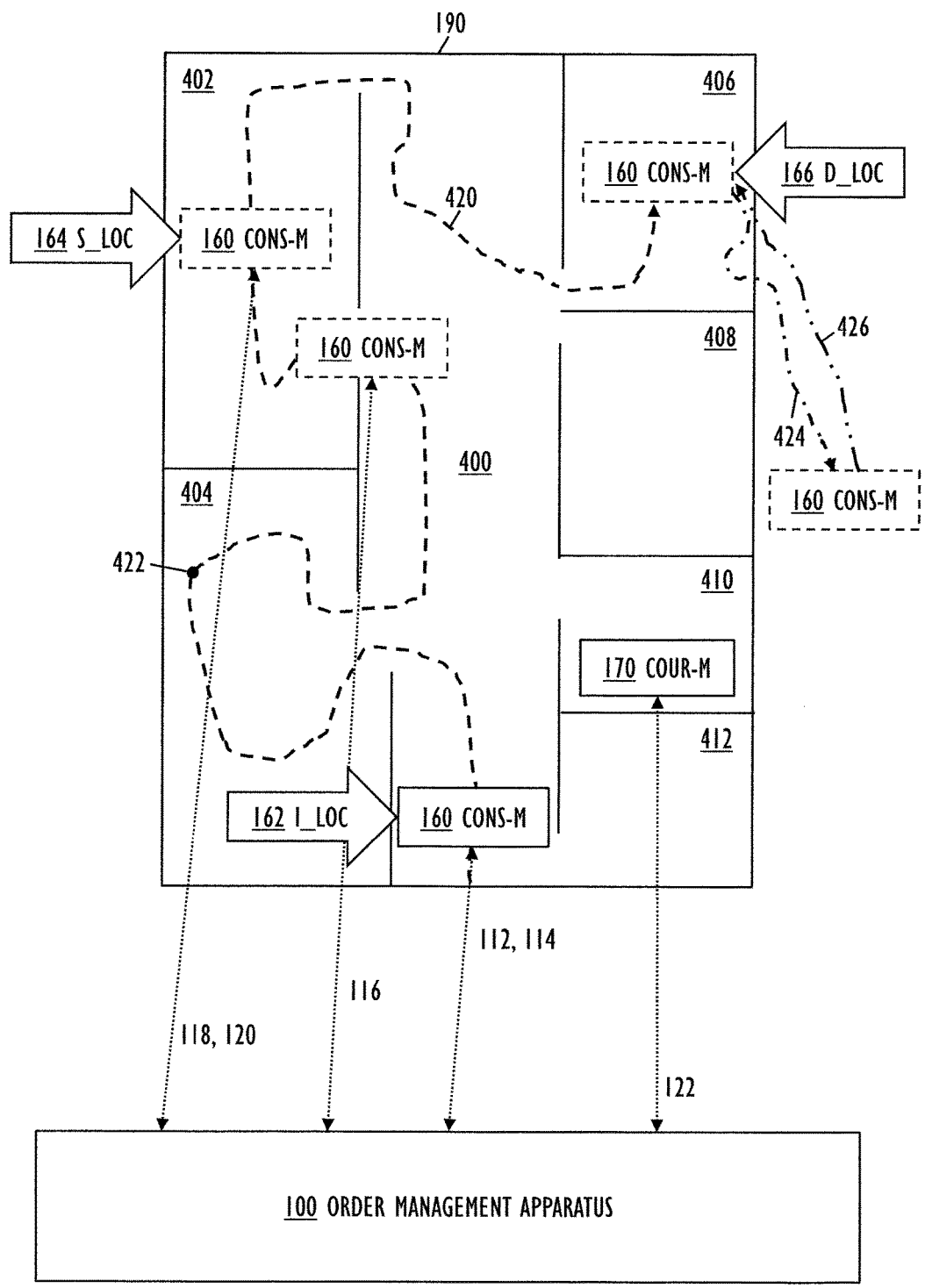
FIGS. 4, 5 and 6 illustrate example embodiments of an order management inside a building between the order management apparatus, a customer mobile apparatus, and a courier mobile apparatus.

FIG. 4 illustrates an example embodiment of the building 190: a large central hall 402, and six individual retail outlets 402, 404, 406, 408, 410, 412. The layout of the building 190 and the number of the retail outlets 402, 404, 406, 408, 410, 412 is just an example embodiment as these parameters may vary.

In an example embodiment, the building 190 comprises one of a shopping mall, an airport terminal, a railway station, a subway station. It is to be noted that the layout of such buildings 190 may vary considerably: they may be large complexes with multiple wings, stories, interconnecting parts, underground parts etc. The delivery location 166 may be any suitable place within the building 190, but it may be beneficial that the place is easy to spot, such as a cafe, lounge, or restaurant, for example.

As can be seen in FIG. 4, the consumer mobile apparatus 160 follows a route 420 through the building 190, whereas, at this stage, the courier mobile apparatus 170 remains stationary.

The method starts in 300 as the order management apparatus 100 is switched on and it starts to process an order.

In 302, the initial indoor location 162 inside the building 190 is obtained 112 with indoor positioning for the consumer mobile apparatus 160.

In 304, information relating to a common catalog including products available from the plurality of retail outlets 402, 404, 406, 406, 408, 410, 412 inside the building 190 is transmitted 114 to the consumer mobile apparatus 160.

In 306, a purchase order of products selected based on the information relating to the common catalog is received 116 from the consumer mobile apparatus 160.

In 308, the subsequent indoor location 164 is obtained 118 with the indoor positioning for the consumer mobile apparatus 160.

In 310, it is tested if the subsequent indoor location 164 is inside the building 190, and if the result positive, the delivery location 166 of the products inside the building 190 is determined 120 with the consumer mobile apparatus 160 in 312, and a delivery order of the products determining the delivery location 166 and collection instructions for the products from the retail outlets 402, 404 (this is later explained with reference to FIG. 5) inside the building 190 is transmitted to the courier mobile apparatus 170 in 314. If the subsequent indoor location 164 is not inside the building, the purchase order may be cancelled or suspended.

The method ends in 318 if the order management apparatus 100 is switched off, or the method may also be suspended after all pending orders are processed until the next not yet processed order is obtained.

The already described example embodiments of the order management apparatus 100, as well as the further example embodiments explained later, may be utilized to enhance the method and the order management apparatus 100 with various further example embodiments.

In an example embodiment, the order management apparatus 100 is further caused to, after obtaining the initial indoor location 162, transmit 320, with the data communication interface 110, to the consumer mobile apparatus 160, information about the retail outlets 402, 404, 406, 408, 410, 412. With this example embodiment, the user of the consumer mobile apparatus 160 may obtain information about shopping opportunities after having entered the building 190.

In a further example embodiment, the order management apparatus 100 is further caused to transmit 320, in connection with the information about the retail outlets 402, 404, 406, 408, 410, 412, information about shopping incentives in the retail outlets 402, 404, 406, 408, 410, 412. In an example embodiment, the shopping incentives include one or more of the following: a discount, money, bonus points, vouchers, lottery tickets, events in a customer loyalty program, etc.

In an example embodiment, the common catalog and the individual catalogs refer to retail product offerings of the retail outlets 402, 404, 406, 408, 410, 412. In an example embodiment, the order management apparatus 100 is further caused to generate the common catalog as follows:
    identify the retail outlets 402, 404, 406, 408, 410, 412 located inside the building 190;
    obtain individual catalogs of the retail outlets 402, 404, 406, 408, 410, 412; and
    assemble the common catalog based on the individual catalogs. The generation of the common catalog may have been made in advance, i.e., the retail outlets 402, 404, 406, 408, 410, 412 participating in the business have provided their individual catalogs. The common catalog may be updated regularly and/or on-demand, as the supply and/or prices change. Special discounts, even for a limited time, may also be taken into account in the assembly of the common catalog. Alternatively, or additionally, the common catalog may be assembled dynamically, for a certain time period (day, week, month, etc.), and/or even for each specific customer.

In an example embodiment, a trade between the consumer (=user of the consumer mobile apparatus 160) and a seller (one or more of the retail outlets 402, 404, 406, 408, 410, 412, and/or a service provider operating the order management apparatus 100) transfers the ownership of the product(s) from the seller to the consumer, and the seller gets a payment in exchange. The customer may also be known as a client, buyer, purchaser, or consumer. The seller may also be known as a vendor, supplier, or retailer; the term "retail" highlighting the fact that the trade is business-to-consumer type rather than the business-to-business type.

In an example embodiment, the purchase order determines types, quantities, and agreed prices for the ordered products. In the current context, the purchase order controls the purchasing of the products from the retail outlets 402, 404, 406, 408, 410, 412, and, together with the delivery order, their delivery to the customer.

The product may be any marketable item produced to satisfy wants or needs. The product may also be known as a commodity, and it may comprise (consumer) goods and services. The products may be, for example, food products, hard goods or durable goods (appliances, electronics, furniture, sporting goods, lumber, etc.), soft goods or consumables (clothing, other fabrics, footwear, cosmetics, medicines, stationery, etc.), arts (books, handicrafts, musical instruments, gifts, records, etc.).

In an example embodiment, the order management apparatus 100 is further caused to receive 322, with the data communication interface 110, at least a part of the purchase order as at least one of a digital image of a product photographed with the customer mobile apparatus 160 inside the building 190, a machine-readable code from a product read with the customer mobile apparatus 160 inside the building 190. This is illustrated in FIG. 4: as the user of the consumer mobile apparatus 160 walks the route 420 through the building 190, s/he sees an interesting product 422 and photographs it or obtains its machine-readable code by the camera or reader 224 (by photographing the machine-readable code or reading it wirelessly from a product tag, for example). The order management apparatus 100 may recognize the product 422 by its code or by a machine-vision application from its image, for example.

In an example embodiment, the order management apparatus 100 is further caused to transmit 326, with the data communication interface 110, to the consumer mobile apparatus 160, a time of delivery of the products. The time of delivery may be the estimated time, at 7 PM, for example, at which the courier will arrive at the delivery location 166.

Figure 5:
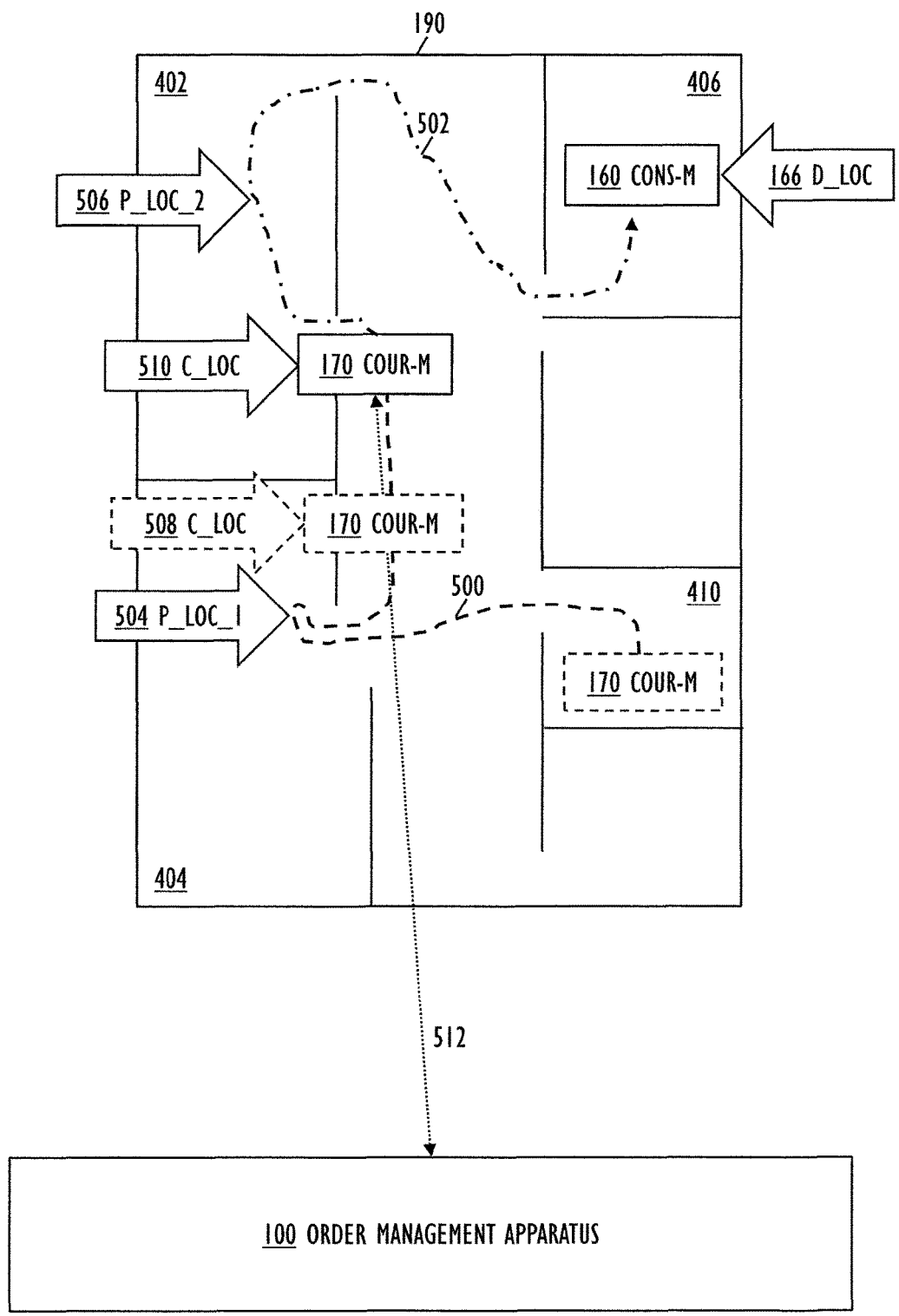

In an example embodiment, the time of the delivery is determined based on locations of the products in the retail outlets 402, 404, 406, 408, 410, 412, an estimated collection time of the products from the retail outlets 402, 404, 406, 408, 410, 412, and the delivery location 166. FIG. 5 illustrates an example embodiment: the customer has ordered two products from retail outlets 402 and 404, and as the locations 504, 506 of the products are known, an estimated route 500, 502 of the courier may be planned, whereby the estimated collection time may be estimated as the propagation velocity of the courier is given some standard value (5 km/h, for example), or it may even be based on the personal characteristics of the courier responsible for the delivery.

In an example embodiment, the order management apparatus 100 is further caused, after the transmission of the time of the delivery, to receive 328, with the data communication interface 110, from the consumer mobile apparatus 160, a further action relating to the purchase order, the further action comprising one of an order confirmation, an order cancellation. With this example embodiment, the consumer is given a chance to estimate whether the time of the delivery suits his/her schedule, and then either confirm the order or cancel it.

In an example embodiment illustrated in FIG. 5, the order management apparatus 100 is further caused 334 to:
- obtain 512, with the indoor positioning interface 108, consecutive indoor locations 508, 510 of the courier mobile apparatus 170 during collection of the products from the retail outlets 402, 404; and
- transmit, with the data communication interface 110, to the consumer mobile apparatus 160, tracking information of the collection of the products from the retail outlets 402, 404 based on the consecutive indoor locations 508, 510.

FIG. 5 also illustrates an example embodiment, wherein the order management apparatus 100 is further caused to generate, for the tracking information, information about updated time of the delivery based on the consecutive indoor locations 508, 510, the collection instructions for the products from the retail outlets 402, 404, the delivery location 166, an elapsed time of the collection of the products from the retail outlets 402, 404, and an estimated remaining collection time of the products from the retail outlets 402, 404. In the example embodiment of FIG. 5 this is shown so that the courier mobile apparatus 170 has arrived at the consecutive indoor location 510 along a route 500, whereas a route 502 will next be taken via the remaining product location 506 to the delivery location 166. The updated time of the delivery may be calculated based on the elapsed route 500 and the estimated remaining route 502.

In an example embodiment illustrated in FIG. 4, the order management apparatus 100 is further caused to:
- obtain continuously, with the indoor positioning interface 108, for the consumer mobile apparatus 160, further indoor locations; and
- if the consumer mobile apparatus exits the building 190, cancel 336 the purchase order, and transmit, with the data communication interface 110, to the consumer mobile apparatus 160 and to the courier mobile apparatus 170, information about the cancellation. In FIG. 4, the consumer mobile apparatus 160 exits the building 190 along a route 424. With this example embodiment, the order may be automatically canceled, in order to save resources of the delivery service.

In an example embodiment illustrated also in FIG. 4, the order management apparatus 100 is further caused to, after the consumer mobile apparatus 160 has exited the building 190, detect, with the indoor positioning interface 108, for the consumer mobile apparatus 160, a new indoor location inside the building 190, reinstate 338 the purchase order, and transmit, with the data communication interface 110, to the consumer mobile apparatus 160 and to the courier mobile apparatus 170, information about the reinstatement. In FIG. 4, the consumer mobile apparatus 160 re-enters the building 190 along a route 426.

Figure 6:
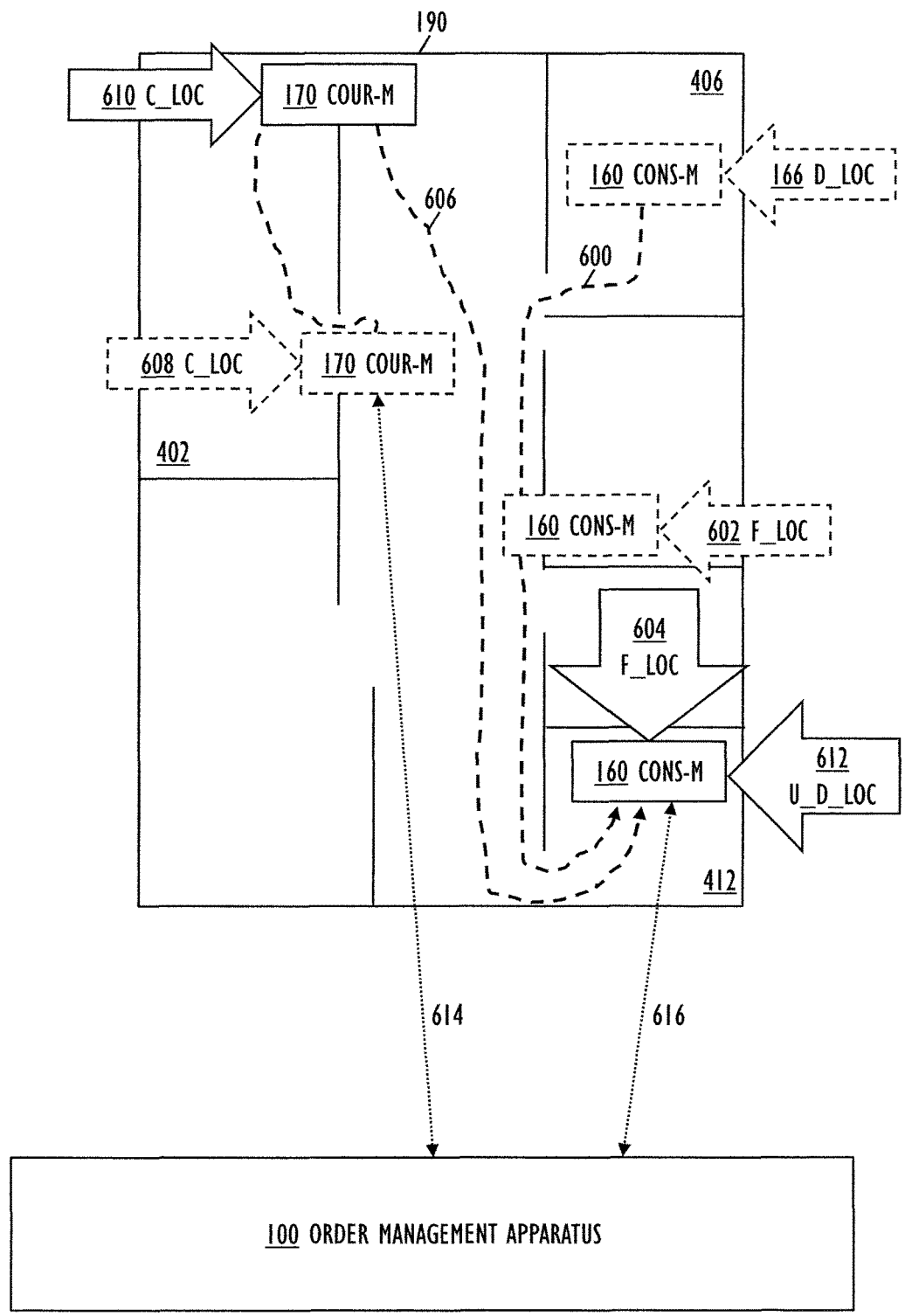

FIG. 6 illustrates an example embodiment, wherein the order management apparatus 100 is further caused 330 to:
- obtain 616 continuously, with the indoor positioning interface 108, for the consumer mobile apparatus 160, further indoor locations 602, 604;
- obtain 614, with the indoor positioning interface 108, consecutive indoor locations 608, 610 of the courier mobile apparatus 170 during collection of the products from the retail outlets 402; and
- before a delivery of the products, re-determine, with the data communication interface 110, with the consumer mobile apparatus 160 and with the courier mobile apparatus 170, an updated delivery location 612 inside the building 190. In the example embodiment of FIG. 6, the consumer mobile apparatus 160 has travelled a route 600, and the courier mobile apparatus 170 will travel along a route 606 to the updated delivery location 612.

Let us finally consider the payment of the ordered products and their delivery.

In an example embodiment, the order management apparatus 100 is further caused to transmit 324, with the data communication interface 110, to the consumer mobile apparatus 160, a machine-readable code as a proof of the purchase order. In an example embodiment, the order management apparatus 100 is further caused to receive 332, with the data communication interface 110, an acknowledgment of a delivery of the products as a result of reading the machine-readable code from the consumer mobile apparatus 160 with the courier mobile apparatus 170. With this example embodiment, it may be ensured that the ordered products are rightfully delivered to the consumer. In an example embodiment, the machine-readable code may be a barcode (=optical machine-readable representation), such as a QR (Quick Response) code (=matrix barcode), displayed on the display 210 of the consumer mobile apparatus 160, and read therefrom with the camera 224 of the courier mobile apparatus 170. Also other kind of electronic interaction, such as with the non-cellular radio transceivers 204 of the mobile apparatuses 160, 170, may instead be applied for the verification of the delivery.

In an example embodiment, the order management apparatus 100 is further caused to receive, with the data communication interface 110, an acknowledgment of a payment of the products in connection with the acknowledgment of the delivery of the products. This example embodiment enables the consumer to pay for the courier during the actual delivery, by cash, or by a payment card (such as a credit card, debit card, bank card, smart card, or proximity card). Another payment option is that the consumer pays for the products online during the actual order, i.e., before, after or in connection with the purchase order generation.

It will be obvious to a person skilled in the art that, as technology advances, the inventive concept can be implemented in various ways. The invention and its embodiments are not limited to the example embodiments described above but may vary within the scope of the claims.

The invention claimed is:
1. A tracking and delivery apparatus comprising:
a data communication interface;
an indoor positioning interface;

one or more processors operatively coupled to one or more memories storing computer program code, the computer program code causing the one or more processors to:

obtain, with the indoor positioning interface, for a consumer mobile apparatus, an initial indoor location inside a building;

after validating that the initial indoor location of the consumer mobile apparatus is in a known building:
transmit, with the data communication interface, to the consumer mobile apparatus, information relating to a common catalog including products available from a plurality of retail outlets inside the known building;

receive, with the data communication interface, from the consumer mobile apparatus, a purchase order of products selected based on: (i) the information relating to the common catalog, and/or (ii) one or more machine-readable codes from a product photographed with a camera of the customer mobile apparatus inside the known building;

obtain, with the indoor positioning interface, for the consumer mobile apparatus, a subsequent indoor location;

in response to the subsequent indoor location being inside the known building, determine, with the data communication interface, with the consumer mobile apparatus, a delivery location of the products inside the known building, and transmit, with the data communication interface, to a courier mobile apparatus, a delivery order of the products determining the delivery location and collection instructions for the products from the retail outlets inside the known building; and in response to the consumer mobile apparatus not being in the known building, cancel the purchase order, and transmit, with the data communication interface, to the consumer mobile apparatus and to the courier mobile apparatus, information about the cancellation.

2. The tracking and delivery apparatus of claim 1, wherein the one or more processors are configured to:
after obtaining the initial indoor location, transmit, with the data communication interface, to the consumer mobile apparatus, information about the retail outlets.

3. The tracking and delivery apparatus of claim 2, wherein the one or more processors are configured to:
transmit, in connection with the information about the retail outlets, information about shopping incentives in the retail outlets.

4. The tracking and delivery apparatus of claim 1, wherein the one or more processors are configured to generate the common catalog as follows:
identify the retail outlets located inside the known building;
obtain individual catalogs of the retail outlets; and
assemble the common catalog based on the individual catalogs.

5. The tracking and delivery apparatus of claim 1, wherein one or more processors are configured to:
transmit, with the data communication interface, to the consumer mobile apparatus, a time of delivery of the products.

6. The tracking and delivery apparatus of claim 5, wherein the time of the delivery is determined based on locations of the products in the retail outlets, an estimated collection time of the products from the retail outlets, and the delivery location.

7. The tracking and delivery apparatus of claim 5, wherein after the transmission of the time of the delivery, receive, with the data communication interface, from the consumer mobile apparatus, a further action relating to the purchase order, the further action comprising one of an order confirmation, an order cancellation.

8. The tracking and delivery apparatus of claim 1, wherein one or more processors are configured to:
obtain, with the indoor positioning interface, consecutive indoor locations of the courier mobile apparatus during collection of the products from the retail outlets; and
transmit, with the data communication interface, to the consumer mobile apparatus, tracking information of the collection of the products from the retail outlets based on the consecutive indoor locations.

9. The tracking and delivery apparatus of claim 8, wherein one or more processors are configured to:
generate, for the tracking information, information about updated time of the delivery based on the consecutive indoor locations, the collection instructions for the products from the retail outlets, the delivery location, an elapsed time of the collection of the products from the retail outlets, and an estimated remaining collection time of the products from the retail outlets.

10. The tracking and delivery apparatus of claim 1, wherein one or more processors are configured to:
after the consumer mobile apparatus has exited the building, detect, with the indoor positioning interface, for the consumer mobile apparatus, a new indoor location inside the building, reinstate the purchase order, and transmit, with the data communication interface, to the consumer mobile apparatus and to the courier mobile apparatus, information about the reinstatement.

11. The tracking and delivery apparatus of claim 1, wherein one or more processors are configured to:
obtain continuously, with the indoor positioning interface, for the consumer mobile apparatus, further indoor locations;
obtain, with the indoor positioning interface, consecutive indoor locations of the courier mobile apparatus during collection of the products from the retail outlets; and
before a delivery of the products, re-determine, with the data communication interface, with the consumer mobile apparatus and with the courier mobile apparatus, an updated delivery location inside the known building.

12. The tracking and delivery apparatus of claim 1, wherein one or more processors are configured to:
transmit, with the data communication interface, to the consumer mobile apparatus, a machine-readable code as a proof of the purchase order.

13. The tracking and delivery apparatus of claim 12, wherein one or more processors are configured to:
receive, with the data communication interface, an acknowledgment of a delivery of the products as a result of reading the machine-readable code from the consumer mobile apparatus with the courier mobile apparatus.

14. The tracking and delivery apparatus of claim 12, wherein one or more processors are configured to:
receive, with the data communication interface, an acknowledgment of a payment of the products in connection with the acknowledgment of the delivery of the products.

15. The tracking and delivery apparatus of claim 1, wherein the known building comprises one of a shopping mall, an airport terminal, a railway station, a subway station.

16. The apparatus of claim 1, wherein the indoor positioning interface is configured to obtain the indoor locations from an indoor magnetic positioning system.

17. A non-transitory computer-readable storage medium comprising a computer program comprising computer program code which, when loaded into a tracking and delivery apparatus causes the tracking and delivery apparatus at least to:
  obtain, with indoor positioning, for a consumer mobile apparatus, an initial indoor location inside a building;
  after validating that the initial indoor location of the consumer mobile apparatus is in a known building:
    transmit, to the consumer mobile apparatus, information relating to a common catalog including products available from a plurality of retail outlets inside the known building;
    receive, from the consumer mobile apparatus, a purchase order of products selected based on: (i) the information relating to the common catalog, and/or (ii) one or more machine-readable codes from a product photographed with a camera of the customer mobile apparatus inside the known building;
    obtain, with the indoor positioning, for the consumer mobile apparatus, a subsequent indoor location;
    in response to the subsequent indoor location being inside the known building, determine, with the consumer mobile apparatus, a delivery location of the products inside the known building, and transmit, to a courier mobile apparatus, a delivery order of the products determining the delivery location and collection instructions for the products from the retail outlets inside the known building; and
    in response to the consumer mobile apparatus being not present in the known building, cancel the purchase order, and transmit, with the data communication interface, to the consumer mobile apparatus and to the courier mobile apparatus, information about the cancellation.

18. A method for use with a tracking and delivery apparatus, the method comprising:
  obtaining, with indoor positioning, for a consumer mobile apparatus, an initial indoor location inside a building;
  after validating that the initial indoor location of the consumer mobile apparatus is in a known building:
    transmitting, to the consumer mobile apparatus, information relating to a common catalog including products available from a plurality of retail outlets inside the known building;
    receiving, from the consumer mobile apparatus, a purchase order of products selected based on the information relating to the common catalog;
    obtaining, with the indoor positioning, for the consumer mobile apparatus, a subsequent indoor location;
    in response to the subsequent indoor location being inside the known building, determining, with the consumer mobile apparatus, a delivery location of the products inside the known building, and transmitting, to a courier mobile apparatus, a delivery order of the products determining the delivery location and collection instructions for the products from the retail outlets inside the known building; and
    in response to the consumer mobile apparatus being not present in the known building, cancel the purchase order, and transmit, with the data communication interface, to the consumer mobile apparatus and to the courier mobile apparatus, information about the cancellation.

* * * * *